United States Patent
Aoki et al.

(10) Patent No.: US 7,978,881 B2
(45) Date of Patent: Jul. 12, 2011

(54) OCCUPANT INFORMATION DETECTION SYSTEM

(75) Inventors: Hiroshi Aoki, Minato-ku (JP); Hirofumi Mita, Minato-ku (JP); Masato Yokoo, Minato-ku (JP); Yuu Hakomori, Minato-ku (JP)

(73) Assignee: Takata Corporation, Tokyo (JP)

( * ) Notice: Subject to any disclaimer, the term of this patent is extended or adjusted under 35 U.S.C. 154(b) by 730 days.

(21) Appl. No.: 12/081,766

(22) Filed: Apr. 21, 2008

(65) Prior Publication Data

US 2008/0267460 A1 Oct. 30, 2008

(30) Foreign Application Priority Data

Apr. 24, 2007 (JP) ................. 2007-114675

(51) Int. Cl.
G06K 9/00 (2006.01)
H04N 7/00 (2011.01)
G06F 7/00 (2006.01)
A47C 13/00 (2006.01)

(52) U.S. Cl. ........... 382/104; 348/113; 701/49; 297/464

(58) Field of Classification Search .................. 382/100, 382/103–105, 118, 276–278; 180/169, 271–272; 280/730.1, 734–735; 297/464; 307/10.1; 340/5.3, 5.53, 425.5, 426, 436, 438, 439, 340/573.1, 575–576, 988; 348/113; 701/45–46, 701/49

See application file for complete search history.

(56) References Cited

U.S. PATENT DOCUMENTS

| | | | | |
|---|---|---|---|---|
| 5,446,661 | A * | 8/1995 | Gioutsos et al. | 701/45 |
| 6,005,958 | A * | 12/1999 | Farmer et al. | 382/103 |
| 6,220,627 | B1 * | 4/2001 | Stanley | 280/735 |
| 6,724,920 | B1 | 4/2004 | Berenz et al. | |
| 7,375,728 | B2 * | 5/2008 | Donath et al. | 345/427 |
| 7,663,502 | B2 * | 2/2010 | Breed | 340/12.25 |
| 2003/0128182 | A1 * | 7/2003 | Donath et al. | 345/156 |
| 2005/0046584 | A1 * | 3/2005 | Breed | 340/825.72 |
| 2006/0208169 | A1 * | 9/2006 | Breed et al. | 250/221 |

FOREIGN PATENT DOCUMENTS

EP 1 746 527 A2 1/2007
JP 2002-264747 9/2002

* cited by examiner

*Primary Examiner* — Samir A Ahmed
*Assistant Examiner* — Mehdi Rashidian
(74) *Attorney, Agent, or Firm* — Foley & Lardner LLP

(57) ABSTRACT

An occupant information detection system for detecting information related to a vehicle occupant on a vehicle seat includes an image detecting section facing a vehicle seat area taking a three-dimensional image, an information extraction processing section extracting information related to a three-dimensional surface profile of a detected object on a vehicle seat based on the three-dimensional image, a conversion processing section converting the extracted information into numerical coordinates of a predetermined coordinate system, and a computation processing section deriving a computed value by subtracting an average of first and second coordinate components from a third coordinate component. The system also includes a determination processing section determining the concave-convex shape of a line segment formed by the arbitrary points and the middle point based on the computed value.

16 Claims, 8 Drawing Sheets

Fig. 5

$$rotX = \begin{pmatrix} 1 & 0 & 0 \\ 0 & \cos r_1 & \sin r_1 \\ 0 & \sin r_1 & \cos r_1 \end{pmatrix}$$

YZ rotation (Rotational angle r1)

$$rotY = \begin{pmatrix} \cos r_2 & 0 & \sin r_2 \\ 0 & 1 & 0 \\ -\sin r_2 & 0 & \cos r_2 \end{pmatrix}$$

XZ rotation (Rotational angle r2)

$$rotZ = \begin{pmatrix} \cos r_3 & -\sin r_3 & 0 \\ \sin r_3 & \cos r_3 & 0 \\ 0 & 0 & 1 \end{pmatrix}$$

XY rotation (Rotational angle r3)

OCCUPANT INFORMATION DETECTION SYSTEM

BACKGROUND

The present application relates to a technology for developing an occupant information detection system installed in a vehicle.

Various occupant restraint devices are know that are intended to restrain a vehicle occupant with an airbag or the like in the event of a vehicle collision. There is a demand for technology in an occupant restraint device for restraining a vehicle occupant in the event of a vehicle collision that more precisely obtains information related to the physique and attitude of the vehicle occupant on a vehicle seat by a detection device such as a camera. For example, though there may be a difference between the actual physique and the apparent physique of the vehicle occupant because of the thickness of clothes and the like, it is advantageous to more precisely obtain the actual physique of the vehicle occupant. Though it is known to estimate the state of the vehicle occupant by the detection device, there is a need for an effective arrangement for more precisely obtaining information related to the physique and the attitude of the vehicle occupant. In addition, there is a need for a process for computing the physique and the attitude of a vehicle occupant with a reduced computing processing load and a reduced storage capacity.

SUMMARY

One disclosed embodiment relates to an occupant information detection system for detecting information related to a vehicle occupant on a vehicle seat. The system includes an image detecting section facing a vehicle seat area taking a three-dimensional image, an information extraction processing section extracting information related to a three-dimensional surface profile of a detected object on a vehicle seat based on the three-dimensional image, a conversion processing section converting the extracted information into numerical coordinates of a predetermined coordinate system, and a computation processing section deriving a computed value by subtracting an average of first and second coordinate components from a third coordinate component. The first and second coordinate components are arbitrary points and the third coordinate component is a middle point of the arbitrary points on a coordinate axis extending between the detected object and the image detecting section in the numerical coordinates. The system also includes a determination processing section determining the concave-convex shape of a line segment formed by the arbitrary points and the middle point based on the computed value. The determination processing section determines that the line segment forms a convex shape as seen from the image detecting section when the computed value is negative, that the line segment forms a concave shape as seen from the image detecting section when the computed value is positive, and that the line segment forms a plane when the computed value is zero.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 5 is an illustration showing a rotation matrix for the coordinate conversion process according to an exemplary embodiment.

DETAILED DESCRIPTION

Figure 1:
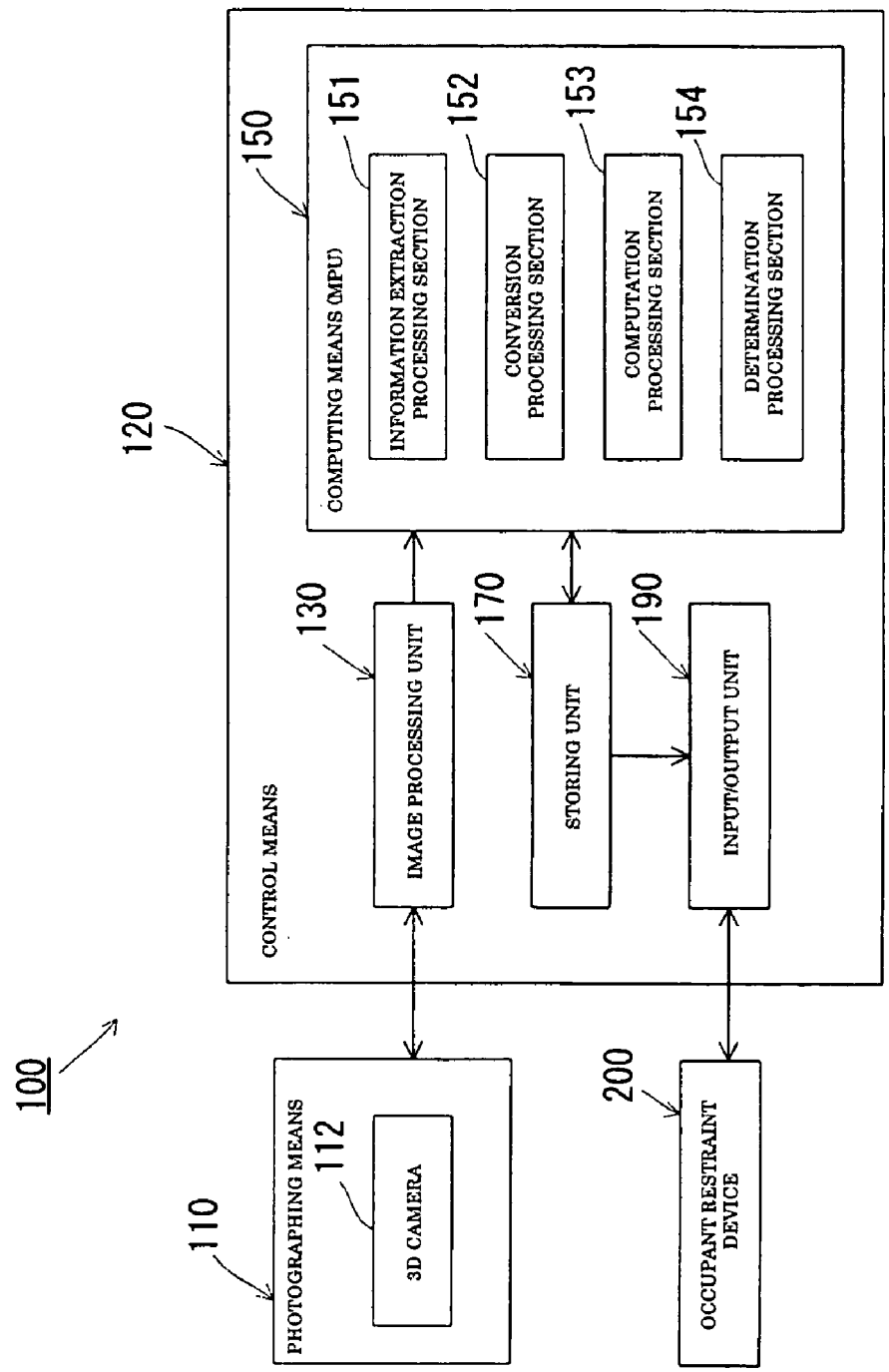
FIG. 1 is a block diagram showing a configuration of an occupant restraint system installed in a vehicle according to an exemplary embodiment.

According to one exemplary embodiment, an occupant restraint system includes a configuration in which a camera for photographing a vehicle occupant estimates the state of the vehicle occupant to control an occupant restraining device such as an airbag based on the state of the occupant estimated by the occupant state estimating means as disclosed in JP-A-2002-264747, which is herein incorporated by reference in its entirety.

Various exemplary embodiments may provide a technology that more precisely and easily detects information related to a vehicle occupant on a vehicle seat.

Although the present invention is typically adapted to an occupant information detection system in an automobile for detecting information related to a vehicle occupant on a vehicle seat, according to other exemplary embodiments the present invention can be adapted to a technology for developing an occupant information detection system for detecting information related to a vehicle occupant on a vehicle seat of a vehicle other than the automobile. The vehicle may be an automobile, an aircraft, a boat, a train, a bus, a truck, etc.

An occupant information detection system is generally a system for detecting information related to a vehicle occupant on a vehicle seat and comprises at least: an image detecting section, an information extraction processing section, a conversion processing section, a computation processing section, and a determination processing section. The vehicle occupant may include an occupant seated directly on a vehicle seat such as a driver-seat occupant (a driver), a front-passenger-seat occupant, a rear-seat occupant, and an occupant seated indirectly on a vehicle seat via a child seat or a junior seat. The information related to the vehicle occupant may include the physique of the vehicle occupant, the attitude of the vehicle occupant, the position of the vehicle occupant, the positions and configurations of respective body parts of the vehicle occupant, the presence or absence of the vehicle occupant, etc.

The image detecting section may be configured to face a vehicle seat area and is configured to taking a three-dimensional image. The vehicle seat area may be a peripheral area of the vehicle seat and is typically defined as a front area and an upper area of a seat back and a head rest or an upper area of a seat cushion. The image detecting section may be a 3-D type monocular C-MOS camera, a 3-D type pantoscopic stereo camera, a laser scanner, or any other image detecting device or system capable of detecting characteristics related to a vehicle occupant. The mounting location for the image detecting section may be any location facing the vehicle seat such as a pillar, a dashboard, or an area around an inner rearview mirror. The number of image detecting sections mounted may be one or more that one.

The information extraction processing section is configured to extract information related to a three-dimensional surface profile of a detected object on a vehicle seat based on the three-dimensional image taken by the image detecting section. Since the three-dimensional image detected by the image detecting section contains information related to distances, the information extraction processing section can extract information according to the distance from the image detecting section. Therefore, image information (e.g., three-dimensional image information) related to the detected object in the vehicle seat area can be more precisely extracted. The information extracted by the information extraction processing section is converted into numerical coordinates in a predetermined coordinate system by the conversion processing section. The predetermined coordinate system may be any coordinate system, for example an orthogonal coordinate system, a polar coordinate system, a nonorthogonal coordinate system, and a generalized coordinate system.

The computation processing section is configured to derive a computed value by subtracting an average of first and second coordinate components from a third coordinate component. The first and second coordinate components are arbitrary points and the third coordinate component is a middle point of the arbitrary points with regard to coordinate components of a coordinate axis extending between the detected object and the photographing section in the numerical coordinates.

The determination processing section is configured to determine the concave-convex shape of a line segment formed by the arbitrary two points and the middle point, i.e. a line segment formed by the three points, based on the computed value derived by the computation processing section. The determination processing section determines that the line segment forms a convex shape as seen from the image detecting section (e.g., the front of the vehicle) when the computed value is negative, that the line segment forms a concave shape as seen from the image detecting section when the computed value is positive, and that the line segment forms a plane when the computed value is zero. The determination process is based on the assumption that a vehicle occupant's face is generally round or oval and a convex shape as seen from the image detecting section (e.g., the front of the vehicle) is highly likely a portion of a vehicle occupant's face.

According to an exemplary embodiment, it is possible to more precisely detect information related to the face of the vehicle occupant on the vehicle seat with reduced computation processing load and reduced storage capacity by focusing on information specific to the face of the vehicle occupant from information obtained from three-dimensional image of the vehicle occupant on the vehicle seat and determining the concave-convex shape formed by arbitrary three points in the converted numerical coordinates.

According to another exemplary embodiment, it is preferable that the computation processing section has a second computation step and the determination processing section has a second determination step.

In the second computation step, when the determination processing section determines that the line segment formed by the arbitrary two points and the middle point forms a convex shape as seen from the image detecting section, the computation processing section sets plural pairs of points which are different from the arbitrary two points in radial distance from the middle point and/or angle in the rotational direction related to the middle point and derives each computed value associated with two points of each pair and the middle point by subtracting an average of first and second coordinate components of the two points from the third coordinate component of the middle point.

In the second determination step, the determination processing section determines the concave-convex shape of a line segment formed by the two points of each pair and the middle point based on each computed value derived by the computation processing section. The determination processing section determines that the middle point forms information of a face of the vehicle occupant when the frequency of line segments forming a convex shape as seen from the image detecting section is high. The determination whether or not the frequency of line segments is high can be achieved based on the degree (e.g., number) of the line segments, the percentage of the line segments occupying the entire line segments, or various parameters corresponding to the degree and the percentage. The accuracy of detecting information of the face of the vehicle occupant on the vehicle seat may be improved by the second computation step of the computation processing section and the second determination step of the determination processing section.

According to another exemplary embodiment, it is preferable that in the second computation step the computation processing section limits the radial distance from the middle point to be in a certain range of distance that is previously defined according to the size of a vehicle occupant's face. The second computation step may reduce or prevent computation of values of a convex shape other than the vehicle occupant's face with regard to points out of the range of the general face size of vehicle occupants.

According to another exemplary embodiment, it is preferable that the computation processing section sets the arbitrary points and the middle point with regard to the detected object in an order from the upper side to the lower side of the vehicle. It is also preferable that the determination processing section has a third determination step in which the determination processing section determines the position of the face of the vehicle occupant based on the position of the middle point that is first determined as a point forming a part of information of the vehicle occupant's face in the second determination step. The computation process and the determination process are based on the assumption that the vehicle occupant's face is the uppermost part of body parts of the vehicle occupant so that the order from the upper side to the lower side of the vehicle enables early detection of the vehicle occupant's face. This exemplary embodiment may reduce the computation processing load and the storage capacity required to detect information of the vehicle occupant's face.

According to another exemplary embodiment, it is preferable that the determination processing section has a fourth determination step in which the determination processing section determines the physique and the attitude of the vehicle occupant based on the position of the face of the vehicle occupant determined in the third determination step. The fourth determination step may enable more precise and easier detection of information related to the physique and the attitude of the vehicle occupant using the information related to the face of the vehicle occupant.

According to one exemplary embodiment, an occupant restraint system includes at least: an occupant information detection system; an occupant restraint device; and a control device. The occupant restraint device is configured to restraining a vehicle occupant in the event of a vehicle collision. The occupant restraint device may include occupant restraint devices such as an airbag device (e.g., airbag module) and a seat belt device.

The control device is configured to change the restraining mode of the occupant restraint device according to the physique and the attitude of the vehicle occupant determined in the fourth determination step by the determination processing section. For example, the performance (e.g., the pressure and flow rate of gas) of an inflator for supplying gas into an airbag to deploy and inflate the airbag and the performance (e.g., the winding amount and winding speed) of a pretensioner or a retractor for controlling a seat belt are variable according to the information related to the physique of the vehicle occupant. The control device may be provided exclusively for controlling the occupant restraint device or may be an existing device for controlling the actuation of an engine/running system and an electrical system so that the existing device is also used for controlling the occupant restraint device. The control device may promote more complete restraint of a vehicle occupant because the occupant restraining mode is controlled according to more highly reliable information related to the vehicle occupant.

A vehicle may include at least: an engine/running system, an electrical system, an actuation control device, a vehicle seat, an image detecting device, and a processing device.

The engine/running system is a system involving an engine and a running mechanism of the vehicle. The electrical system is a system involving electrical parts used in the vehicle. The actuation control device is a device having a function of controlling the actuation of the engine/running system and the electrical system. The image detecting device is disposed to face to said vehicle seat and is a device of taking a three-dimensional image. The processing device is a device for processing information obtained by the image detecting device in the actuation control device. The processing device has an occupant information detection system as mentioned above. In this arrangement, information related to the vehicle occupant detected by the occupant information detection system is suitably processed by the processing device and is used for various controls with regard to the vehicle such as the occupant restraint device which is operable for restraining the vehicle occupant.

A vehicle can be provided in which information related to the vehicle occupant precisely detected by the occupant information detection system is used for various controls regarding the vehicle.

The disclosed system may enable more precise and easier detection of information related to a vehicle occupant on a vehicle seat by focusing on information specific to the face of the vehicle occupant from information obtained from three-dimensional image of the vehicle occupant on the vehicle seat and determining the concave-convex shape formed by three arbitrary points in the converted numerical coordinates to locating the face.

Hereinafter, embodiments of the present invention will be described with reference to drawings.

FIG. 1 shows a configuration of an occupant restraint system 100 installed in a vehicle.

According to the illustrated embodiment, an occupant restraint system 100 may be installed in a vehicle and has an occupant information detection system comprising: a 3D camera 112 for taking a three-dimensional image; an information extraction processing section 151 for extracting information related to a three-dimensional surface profile of a detected object on a vehicle seat based on the three-dimensional image taken by the 3D camera 112; a conversion processing section 152 for converting the information extracted by the information extraction processing section 151 into numerical coordinates of a predetermined coordinate system; and a computation processing section 153 for deriving a computed value by subtracting an average of first and second coordinate components from a third coordinate component. The first and second coordinate components are arbitrary points and the third coordinate component is a middle point of the arbitrary points with regard to coordinate components of a coordinate axis extending between the detected object and the 3D camera 112 in the numerical coordinates converted by the conversion processing section 152. The occupant information detection system also includes a determination processing section 154 for determining the concave-convex shape of a line segment formed by the arbitrary points and the middle point based on the computed value derived by the computation processing section 153.

The occupant restraint system 100 of the illustrated embodiment may be installed in an automobile for restraint of a driver and mainly includes a imaging detecting device which may preferably be a photographing device 110, a controller 120, and an occupant restraint apparatus 200. The vehicle may also comprise (but not shown) an engine/running system involving an engine and a running mechanism of the vehicle, an electrical system involving electrical parts used in the vehicle, and an actuation controller for conducting the actuation control of the engine/running system and the electrical system. The actuation controller may be composed of the controller 120 as a component of the occupant restraint system 100 or may be provided exclusively for the engine/running system and the electrical system.

The photographing device 110 comprises a 3D camera 112 as a photographing device and a data transfer circuit. The 3D camera 112 may be a 3-D (three-dimensional) camera (or monitor) of a C-MOS or CCD (charge-coupled device) type in which light sensors are arranged into an array (lattice) structure. The camera 112 may take three-dimensional images from a single view point. Thus, distance relative to the object is measured a plurality of times to detect a three-dimensional surface profile, thereby identifying the presence or absence, the size, the position, and the attitude of the detected object. As the 3D camera 112, a 3-D type monocular C-MOS camera or a 3-D type pantoscopic stereo camera may be employed. The photographing device 110 (the 3D camera 112) may be disposed to face to a vehicle seat area for taking a three-dimensional image. Instead of the 3D camera 112, a laser scanner capable of obtaining three-dimensional images may be employed.

Figure 2:
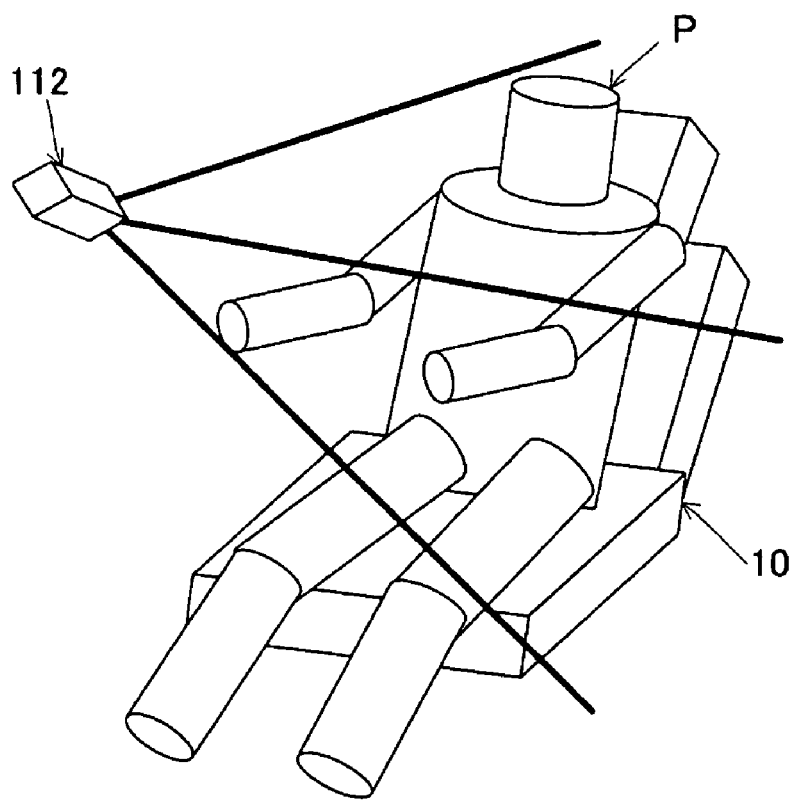
FIG. 2 is an illustration showing an image of a driver being photographed by a 3D camera mounted in an A-pillar on a side of a driver seat according to an exemplary embodiment.

The 3D camera 112 may be mounted in an embedded style in an instrument panel, an A-pillar, or an area around a windshield in a front portion of the vehicle in such a manner as to have an angle capable of photographing a vehicle occupant or a plurality of vehicle occupants. FIG. 2 shows a state where an image of a driver P is photographed by the 3D camera 112, which may be mounted in an A-pillar on a driver's side.

The controller 120 further comprises at least an image processing unit 130, a computing device (MPU) 150, a storing unit 170, an input/output unit 190, and peripheral devices (not shown). The controller 120 is configured as an occupant information processing unit (CPU) for processing the information related to an occupant based on images taken by the 3D camera 112 of the photographing device 110. The controller 120 and the photographing device 110 (the 3D camera 112) cooperate to compose an occupant information detection system.

The image processing unit 130 controls the camera to obtain good quality images and for controlling the image processing for processing images taken by the 3D camera 112 to be used for analysis. The adjustment of the frame rate, the shutter speed, the sensitivity, and the accuracy correction of the camera are operated to control the dynamic range, the brightness, and the white balance of the image. Spin compensation for the image, correction of distortion of the lens, a filtering operation, and a difference operation may be used as image preprocessing operations.

The computing device 150 of the illustrated embodiment comprises at least an information extraction processing section 151, a conversion processing section 152, a computation processing section 153, and a determination processing section 154. Two or more of the information extraction processing section 151, the conversion processing section 152, the computation processing section 153, and the determination processing section 154 may be combined according to the exemplary embodiment.

The information extraction processing section 151 of the computing device 150 carries out a process of extracting information related to three-dimensional surface profile of a detected object on the driver seat based on the three-dimensional image taken by the 3D camera 112. Specifically, the information extraction processing section 151 extracts (e.g., derives) image information related to an upper area of the seat back of the driver seat area from three-dimensional image of the image processing unit 130. The driver seat area may be a peripheral area of the driver seat and is typically defined as a front area and an upper area of the seat back and a head rest or an upper area of a seat cushion.

The conversion processing section 152 of the computing device 150 is configured to convert the information extracted by the information extraction processing section 151 into numerical coordinates in a predetermined coordinate system. The coordinate system may be any of various coordinate systems such as an orthogonal coordinate system, a polar coordinate system, a nonorthogonal coordinate system, a generalized coordinate system, etc.

Figure 3:
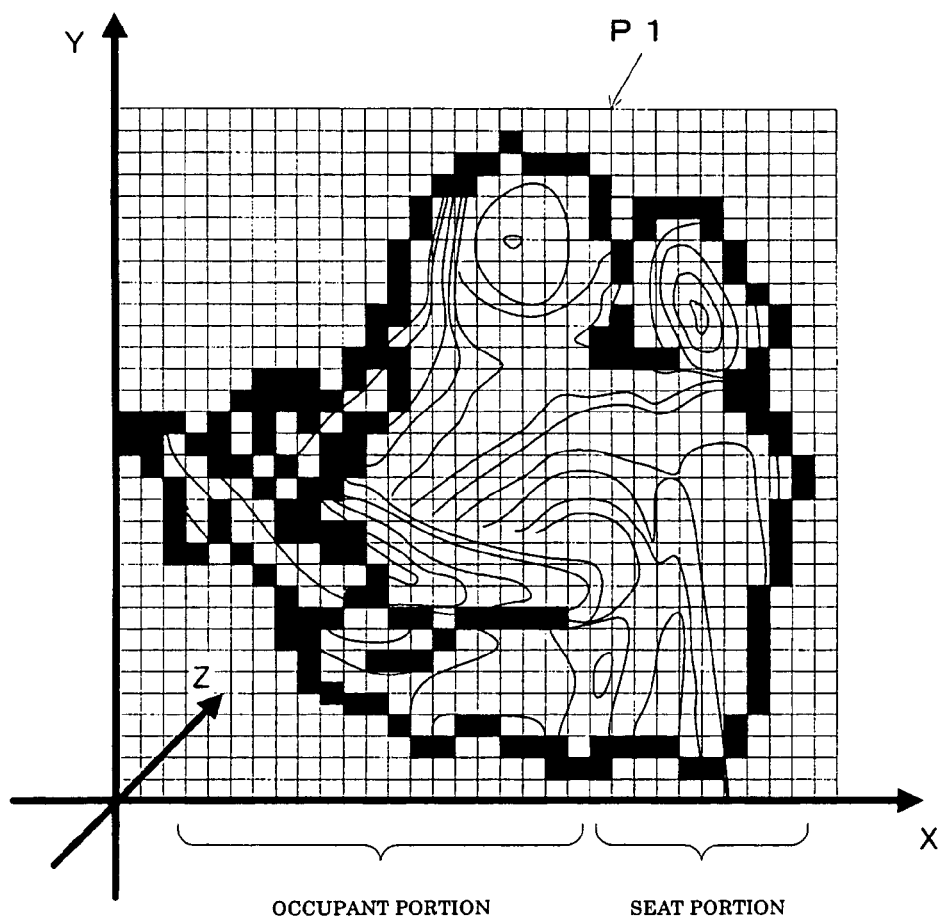
FIG. 3 is an illustration showing pixel information in which extracted information is converted into numerical coordinates of an orthogonal coordinate system by a conversion processing section according to an exemplary embodiment.

FIG. 3 shows pixel information P1 in which the information extracted by the information extraction processing section 151 is converted into the numerical coordinates of the orthogonal coordinate system. The conversion processing section 152 also converts the system of coordinates with their origin at the center of the 3D camera 112 into a system of coordinates with their origin at the center of the vehicle body. The system of coordinates with their origin at the center of the vehicle body may be a coordinate system related to a view point as seeing the vehicle occupant from the front of the vehicle, a coordinate system related to a view point as seeing the vehicle occupant from a side of the vehicle, or a coordinate system related to a view point as seeing the vehicle occupant from the top of the vehicle.

Figure 4:
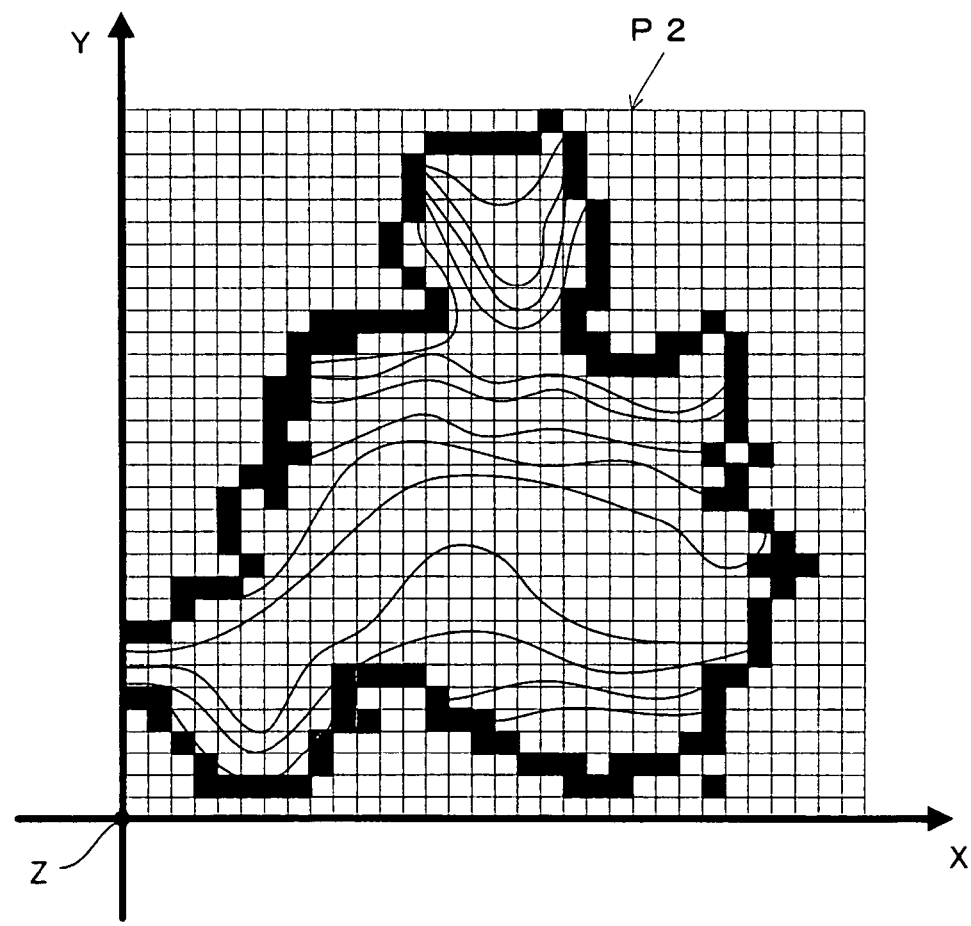
FIG. 4 is an illustration showing pixel information in which the coordinate system is converted into a coordinate system related to a view point facing the driver from the front of the vehicle by the conversion processing section according to an exemplary embodiment.

FIG. 4 shows pixel information P2 in which the system of coordinates with their origin at the center of the 3D camera 112 is converted into a coordinate system related to a view point as seeing the driver P from the front of the vehicle by the conversion processing section 152. It should be noted that this coordinate conversion process may be executed by use of the rotation matrix shown in FIG. 5.

The computation processing section 153 of the computing device 150 computes a contour discriminating value V for discriminating the contour of the driver using arbitrary three points in the pixel information P2 obtained by the conversion processing section 152.

Figure 6:
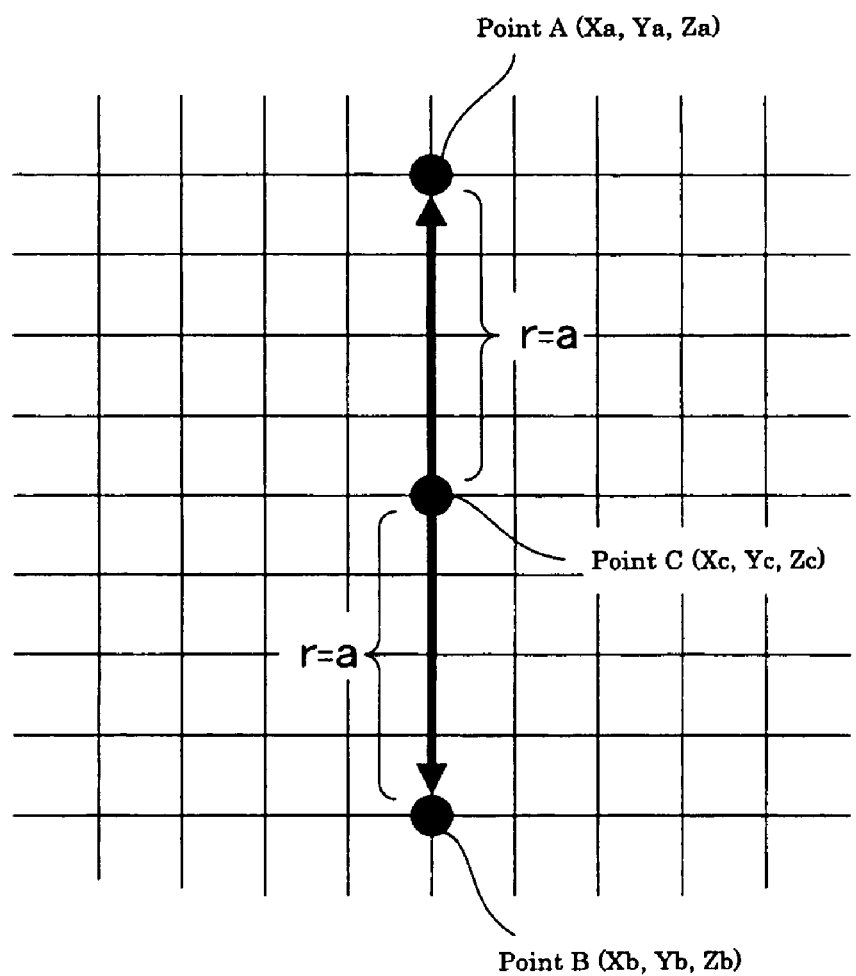
FIG. 6 is an illustration showing arbitrary points in the pixel information according to an exemplary embodiment.

The description related to the three arbitrary points in the pixel information P2 of an exemplary embodiment will be made with reference to FIG. 6. As shown in FIG. 6, a point A (Xa, Ya, Za), a point B (Xb, Yb, Zb), and a point C (Xc, Yc, Zc) are set as the arbitrary points. The point C is a middle point between the point A and the point B in the three-dimensional surface profile of the driver and the distance between the point A and the point C and the distance between the point C and the point B are about equal (e.g., distance r=a). The point C may be set as the middle point after setting the arbitrary point A and the arbitrary point B. Alternatively, the point A and the point B may be set as the both side points after setting the arbitrary point C.

Figure 7:
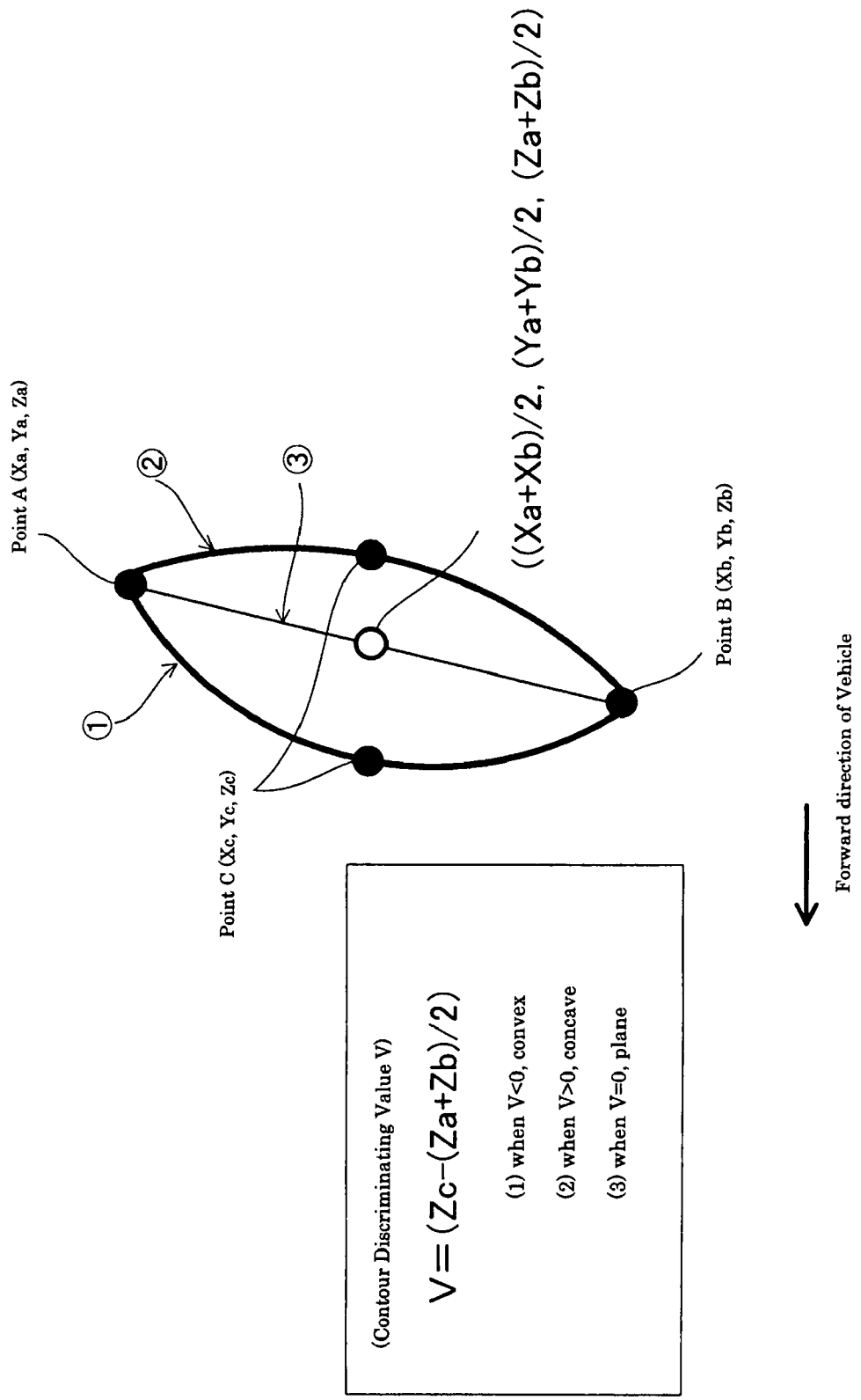
FIG. 7 is an illustration describing a contour discriminating value according to an exemplary embodiment.

The description related to the contour discriminating value V of this embodiment will be made with reference to FIG. 7. As shown in FIG. 7, in an exemplary embodiment, distance information of the three points point A through C or coordinate components on the axis Z of the respective points (e.g., Za, Zb, Zc) are used. The axis Z in this case is a coordinate axis extending between the driver and the 3D camera 112. A value obtained by subtracting an average of Za and Zb from Zc is defined as the contour discriminating value V.

The determination processing section 154 of the computing device 150 determines the concave-convex shape of a line segment formed by the three points A-C based on the contour discriminating value V computed by the computation processing section 153. Specifically, when V<0 the determination processing section 154 determines that the line segment formed by the three points A-C forms a convex shape as seen from the front of the vehicle. When V>0 the determination processing section 154 determines that the line segment formed by the three points A-C forms a concave shape as seen from the front of the vehicle. When V=0, the determination processing section 154 determines that the line segment formed by the three points A-C forms a plane.

When the determination processing section 154 determines that the line segment formed by the three points A-C has a convex shape as seen from the 3D camera 112, the contours of the areas around the points A-C are further detected in detail. According to the detected results, it is determined that the convex shape may be a portion of the driver's face. Typically, the computation processing section 153 computes a face confidence value S. The determination processing section 154 determines the possibility that the point C is a portion of the driver's face based on the face confidence value S.

Figure 8:
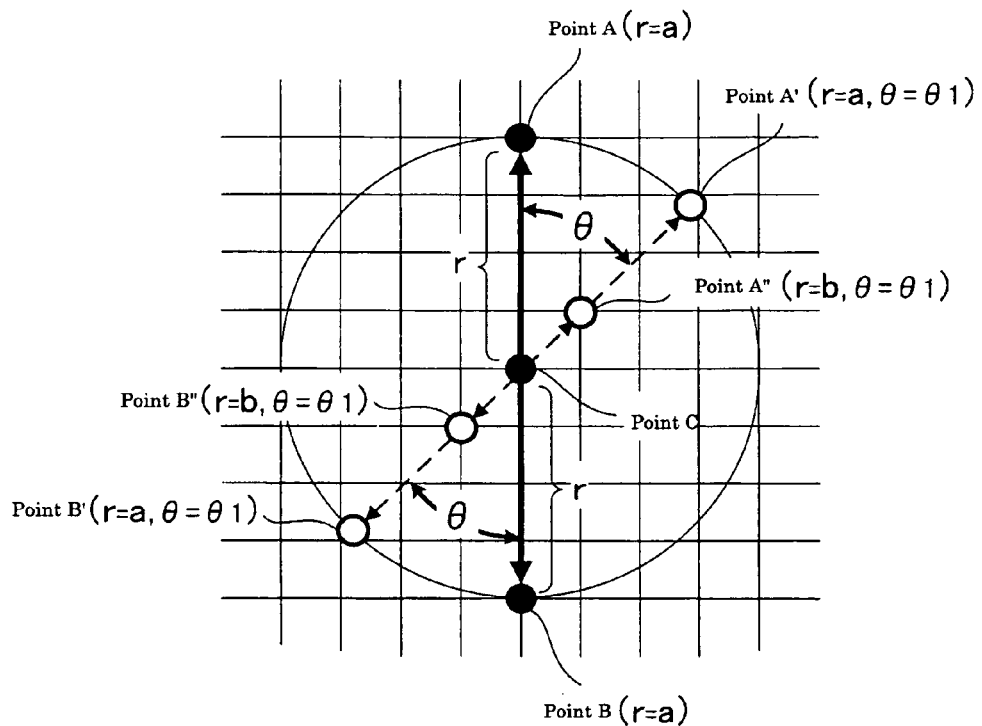
FIG. 8 is an illustration describing a face confidence value according to an exemplary embodiment.

The description related to the face confidence value S of an exemplary embodiment will be made with reference to FIG. 8. As shown in FIG. 8, a pair of points A and B are arranged generally equidistant from a third point C such that points A, B, and C are substantially collinear. In computing the face confidence value S, plural pairs of points are set that are different from the points A and B in a radial distance from the point C and/or an angle in the rotational direction related to the point C. For example, a pair of points A' and B' have a radial distance (r) equal to a distance "a" from the point C. An angle (θ) is the angular difference between the line formed by points A and B and the line formed by points A' and B'. In a rotational direction related to (e.g., rotated about) the point C, the angle (θ) is equal to "θ1." A pair of points A" and B" have a radial distance (r) equal to "b" and an angle (θ) is equal to "θ1". The pair of points A' and B' and the pair of points A" and B" are different from the arbitrary points in radial distance from the middle point and/or angle in the rotational direction related to the middle point. It should be understood that, in setting the plural pairs of points, the plural pairs of points may be different from the arbitrary two points with regard to at least of one of the radial distance from the point C and the angle in the rotational direction related to the point C.

The computation processing section 153 computes the contour discriminating values V in the aforementioned manner using points with varying the radial distance from the point C and the angle in the rotational direction related to the point C. The computation process is based on the idea that the vehicle occupant's face is round or oval and a convex shape as seen from the 3D camera 112 (e.g., the front of the vehicle) is highly likely a portion of a vehicle occupant's face.

The radial distance "r" from the point C is preferably set within a certain distance previously defined according to the general face size of a vehicle occupant. This can prevent useless work of computing a contour discriminating value V of a convex shape other than the vehicle occupant's face with regard to points out of the range of the general face size. If a contour discrimination value V is computed with regard to points out of the range of the general face size of vehicle occupant, it is determined that the detected convex is quite unlikely a portion of the vehicle occupant's face when the contour discriminating value V obtained with regard to points over the certain distance. In this case, a process of reducing the face confidence value S as will be described is taken. The angle θ in the rotational direction related to the point C is preferably set within a range of from 180° to 360°.

By using the contour discriminating values V obtained using points with varying the radial distance from the point C and the angle in the rotational direction related to the point C and assuming that additional function is Conf=1 when V<0 and additional function is Conf=0 when V≧0, the sum of the additional functions may represent the face confidence value S. The determination processing section 154 determines that the point C forms a part of information of the driver's face when the face confidence value S exceeds a predetermined threshold because the frequency of line segments forming convex shape as seen from the 3D camera disposed in a front portion of the vehicle is relatively high. The exemplary embodiment can improve the detection accuracy of information of the vehicle occupant's face. In the determination of the second determination step, another parameter other than the face confidence value S may be used, for example the degree (number) of line segments forming a convex shape as seen from 3D camera 112 disposed in the front portion of the vehicle or the percentage of the line segments occupying the entire line segments.

The order that the computation processing section 153 sets arbitrary three points in the image information P2 obtained by the conversion processing section 152 is preferably from the upper side to the lower side of the vehicle. The determination processing section 154 determines the position of the vehicle occupant's face based on the position of the point C, which is first determined as a point forming a part of information of the vehicle occupant's face in the aforementioned second determination step. The computation process and the determination process are based on the assumption that the vehicle occupant's face is the uppermost part of body parts of the vehicle occupant so that the order of from the upper side to the lower side of the vehicle in detection enables early detection of the vehicle occupant's face. The exemplary embodiment may be advantageous because the computation processing load and the storage capacity to be required to detect information of the vehicle occupant's face can be reduced.

The determination processing section 154 determines the physique and the attitude of the vehicle occupant based on the position of the vehicle occupant's face determined in the aforementioned third determination step. The exemplary embodiment may enable more precise and easier detection of information related to the physique and the attitude of the vehicle occupant, using information related to the position of the vehicle occupant's face.

Returning to FIG. 1, the storing unit 170 of the illustrated embodiment may store (e.g., records) data for correction, buffer frame memory for preprocessing, defined data for recognition computing, reference patterns, the computed results of the computing device 150, and/or an operation control software.

The input/output unit 190 of an exemplary embodiment outputs a control signal to the occupant restraint device 200 according to the information in the storing unit 170. The occupant restraint device 200 is composed of one or some of occupant restraint devices such as an airbag device (e.g., airbag module) and a seat belt device that operate for restraining a vehicle occupant in the event of a vehicle collision. The occupant restraint device 200 controls its mode of restraining the vehicle occupant based on the information outputted from the input/output unit 190. Specifically, the occupant restraint device 200 restrains the vehicle occupant in a suitable mode according to the position of the face, the physique and the attitude of the vehicle occupant detected. If necessary, a warning device (e.g., display, a sound, etc.) may be placed in addition to the occupant restraint device 200.

If the occupant restraint device 200 is an airbag module comprising an inflator (e.g., gas supplying means) and an airbag, the inflator is actuated according to a control signal from the input/output unit 190 to supply gas for deployment and inflation into the airbag such that the pressure and flow rate of gas supplied from the inflator to the airbag is variable according to the information related to the physique of the driver P. Therefore, the restraining performance (e.g., occupant restraining mode) by the airbag which is deployed and inflated into an occupant restraining area can be changed according to the physique of the vehicle occupant.

It should be noted that an ECU for controlling the entire vehicle may be provided between the input/output unit 190 and the occupant restraint device 200. Such an exemplary embodiment enables the ECU to output control signals to the occupant restraint device 200 based on information related to the vehicle, information related to traffic conditions around the vehicle, information related to weather condition and related to time zone as well as the determination results by the determination processing section 154. The information related to the vehicle may include collision prediction information of the vehicle by a radar or camera, the state (e.g., open or closed) of a vehicle door, whether the seat belt is being worn, the operation of brakes, the vehicle speed, the steering angle, etc.

According to an exemplary embodiment, in a system of detecting a vehicle occupant, it is possible to precisely detect information related to a face of a vehicle occupant on a vehicle seat with reduced computation processing load and reduced storage capacity by focusing on information specific to the face of the vehicle occupant from information obtained from three-dimensional image of the vehicle occupant on the vehicle seat and determining the concave-convex shape formed by arbitrary three points in the converted numerical coordinates to locate the face.

According to an exemplary embodiment, an occupant restraint system 100 may be configured to provide more complete restraint of a vehicle occupant in a vehicle.

The present invention is not limited to the aforementioned embodiments and various applications and modifications may be made. For example, the following respective embodiments based on the aforementioned embodiments may be carried out.

The second computation step by the computation processing section 153, or the second determination step, the third determination step or the fourth determination step by the determination processing section 154 may be omitted.

The aforementioned embodiments have been described with reference to a system where the information related to the vehicle occupant's face is detected by the occupant information detection system, which comprises the photographing device 110 and the controller 120 used for controlling the occupant restraint device 200. The information related to the vehicle occupant's face may also be used for controlling other operation device except the occupant restraint device 200 according to other exemplary embodiments.

The aforementioned embodiments have been described with reference to the occupant restraint system 100 installed for restraining the vehicle occupant in the driver seat, the occupant restraint device may be an occupant restraint device for restraining a vehicle occupant in a front passenger seat or a rear seat as well as the driver seat. The 3D camera 112 may be located at a suitable vehicle part such as an instrument panel, a pillar, a door, a windshield, a seat in a front portion of an automobile, etc.

The aforementioned embodiments have been described with reference to deriving information of the face of a vehicle occupant sitting directly in a driver seat. According to other exemplary embodiments, the information may be related to a face of a vehicle occupant sitting indirectly in the vehicle seat via an inclusion such as a child seat or a junior seat.

Though the aforementioned embodiments have been described with regard to the arrangement of the occupant restraint system to be installed in an automobile, the disclosed system may be adapted to occupant restraint devices to be installed in various vehicles such as an automobile, an airplane, a boat, a train, a bus, and a truck.

Japan Priority Application 2007-114675, filed Apr. 24, 2007, including the specification, drawings, claims and abstract, is incorporated herein by reference in its entirety.

Given the disclosure of the invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant information detection system for detecting information related to a vehicle occupant on a vehicle seat, comprising:
    an image detecting device configured to face a vehicle seat area and obtain a three-dimensional image;
    an information extraction processing section of a computing device configured to extract information related to a three-dimensional surface profile of a detected object on a vehicle seat based on the three-dimensional image;
    a conversion processing section of the computing device configured to convert the extracted information into numerical coordinates of a predetermined coordinate system;
    a computation processing section of the computing device configured to derive a computed value by subtracting an average of first and second coordinate components from a third coordinate component, wherein the first and second coordinate components are arbitrary points and the third coordinate component is a middle point of the arbitrary points on a coordinate axis extending between the detected object and the image detecting section in the numerical coordinates; and
    a determination processing section of the computing device determining the concave-convex shape of a line segment formed by the arbitrary points and the middle point based on the computed value;
    wherein the determination processing section is configured to determine that the line segment forms a convex shape as seen from the image detecting section when the computed value is negative, that the line segment forms a concave shape as seen from the image detecting section when the computed value is positive, and that the line segment forms a plane when the computed value is zero.

2. An occupant information detection system as claimed in claim 1, wherein the computation processing section is configured to perform a second computation step that sets further plural pairs of points that are different from the arbitrary points in radial distance from the middle point and/or angle in a rotational direction related to the middle point and derives each computed value associated with two points of each pair and the middle point by subtracting an average of first and second coordinate components of the two points from the third coordinate component of the middle point when the determination processing section determines that the line segment formed by the arbitrary two points and the middle point forms a convex shape as seen from the image detecting section,
    wherein, the determination processing section is configured to perform a second determination step in which the determination processing section determines the concave-convex shape of a line segment formed by the two points of each pair and the middle point based on each computed value derived by the computation processing section,
    and wherein the determination processing section is configured to determine that the middle point forms information of a face of the vehicle occupant when the frequency of line segments forming a convex shape as seen from the image detecting section is high.

3. An occupant information detection system as claimed in claim 2, wherein in the second computation step, the computation processing section is configured to limit the radial distance from the middle point to be in a certain range of distances that is previously defined according to the size of a vehicle occupant's face.

4. An occupant information detection system as claimed in claim 2, wherein the computation processing section is configured to set the arbitrary two points and the middle point with regard to the detected object in an order from the upper side to the lower side of the vehicle, and
    wherein, the determination processing section is configured to perform a third determination step that determines the position of the face of the vehicle occupant based on the position of the middle point that is first determined as a point forming a part of information of the vehicle occupant's face in the second determination step.

5. An occupant information detection system as claimed in claim 4, wherein the determination processing section is configured to perform a fourth determination step that determines the physique and the attitude of the vehicle occupant based on the position of the face of the vehicle occupant determined in the third determination step.

6. An occupant restraint system comprising:
an occupant information detection system as claimed in claim 5;
an occupant restraint device for restraining the vehicle occupant in the event of a vehicle collision; and
a control device for changing a restraining mode of the occupant restraint device according to the physique and the attitude of the vehicle occupant determined in the fourth determination step.

7. A vehicle comprising:
an engine/running system;
an electrical system;
an actuation control device for controlling the actuation of the engine/running system and the electrical system;
a vehicle seat; and
an occupant information detection system as claimed in claim 1.

8. An occupant information detection system for detecting information related to a vehicle occupant on a vehicle seat, comprising:
an image detecting device configured to face a vehicle seat area and obtain a three-dimensional image;
a controller including an information extraction processing section of a computing device configured to extract information related to a three-dimensional surface profile of a detected object on the vehicle seat based on the three-dimensional image;
wherein the controller further includes a conversion processing section of the computing device configured to convert the extracted information into numerical coordinates of a predetermined coordinate system, and a computation processing section of the computing device configured to derive a computed value by subtracting an average of first and second coordinate components from a third coordinate component, wherein the first and second coordinate components are arbitrary points and the third coordinate component is a middle point of the arbitrary points on a coordinate axis extending between the detected object and the image detecting section in the numerical coordinates; and
wherein the controller further includes a determination processing section of the computing device configured to determine the concave-convex shape of a line segment formed by the arbitrary points and the middle point based on the computed value, wherein the determination processing section is configured to determine that the line segment forms a convex shape when the computed value is negative and that the line segment forms a concave shape when the computed value is positive, and that the line segment forms a plane when the computed value is zero.

9. The system of claim 8, wherein the computation processing section is configured to perform a second computation step that sets further plural pairs of points that are different from the arbitrary points in radial distance from the middle point and/or angle in a rotational direction related to the middle point and is also configured to derive each computed value associated with two points of each pair and the middle point by subtracting an average of first and second coordinate components of the two points from the third coordinate component of the middle point when the determination processing section determines that the line segment formed by the arbitrary two points and the middle point forms a convex shape as seen from the image detecting section.

10. The system of claim 9, wherein, the determination processing section is configured to perform a second determination step in which the determination processing section determines the concave-convex shape of a line segment formed by the two points of each pair and the middle point based on each computed value derived by the computation processing section.

11. The system of claim 10, wherein the determination processing section is configured to determine that the middle point forms information of a face of the vehicle occupant when the frequency of line segments forming a convex shape as seen from the image detecting section is high.

12. The system of claim 11, wherein in the second computation step, the computation processing section is configured to limit the radial distance from the middle point to be in a certain range of distances that is previously defined according to the size of a vehicle occupant's face.

13. The system of claim 11, wherein the computation processing section is configured to set the arbitrary two points and the middle point with regard to the detected object in an order from the upper side to the lower side of the vehicle.

14. The system of claim 13, wherein the determination processing section is configured to perform a third determination step that determines the position of the face of the vehicle occupant based on the position of the middle point that is first determined as a point forming a part of information of the vehicle occupant's face in the second determination step.

15. The system of claim 14, wherein the determination processing section is configured to perform a fourth determination step that determines the physique and the attitude of the vehicle occupant based on the position of the face of the vehicle occupant determined in the third determination step.

16. The system of claim 8, wherein the controller further comprises an image processing unit configured to control the image capturing device to adjust the quality of the captured image.

* * * * *